Figure 1:
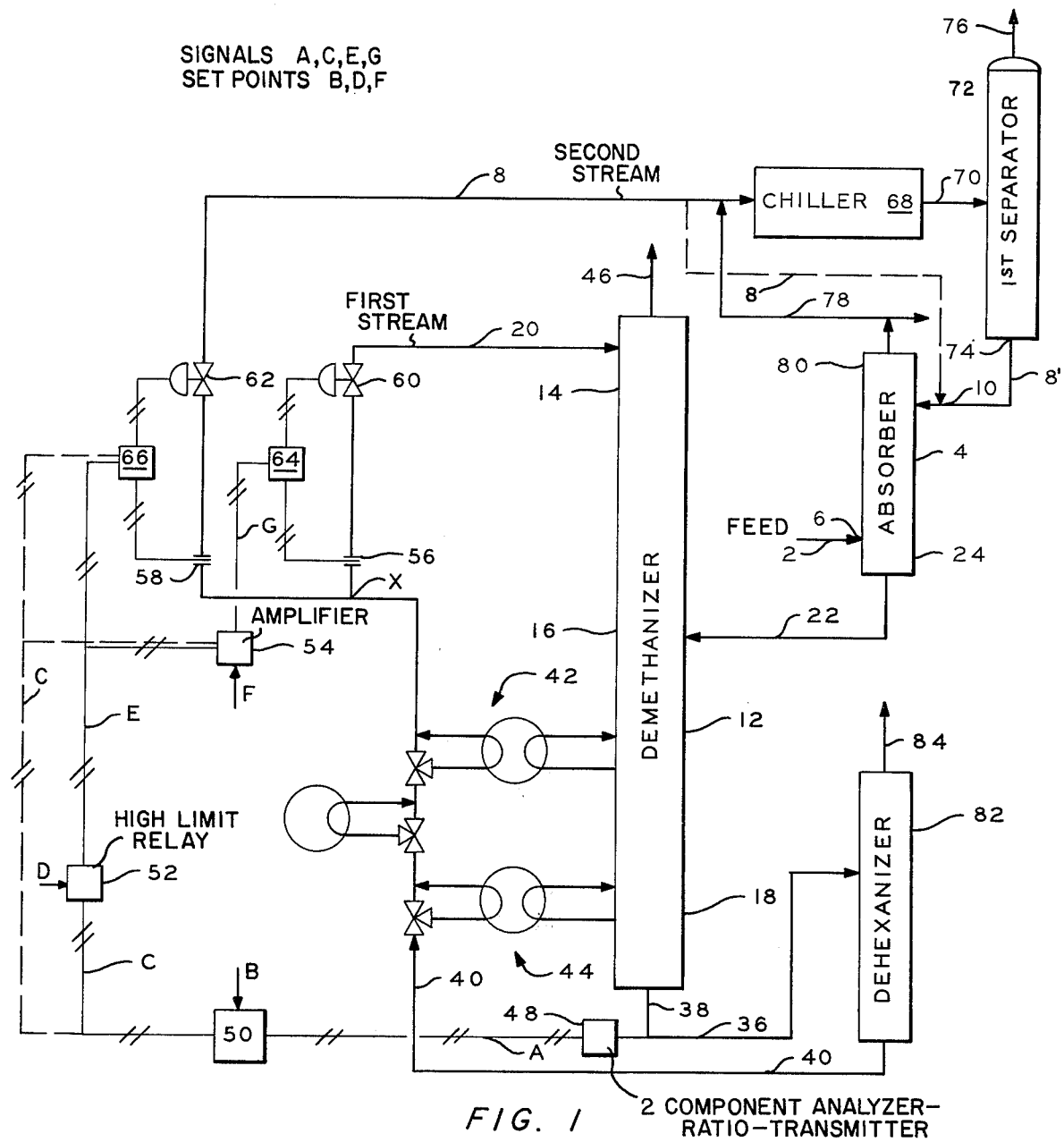

United States Patent [19]
Anderson

[11] 3,926,742
[45] Dec. 16, 1975

[54] CONTROLLED FRACTIONATION METHOD AND APPARATUS

[75] Inventor: John E. Anderson, Bartlesville, Okla.

[73] Assignee: Phillips Petroleum Company, Bartlesville, Okla.

[22] Filed: Aug. 1, 1974

[21] Appl. No.: 493,916

Related U.S. Application Data

[63] Continuation of Ser. No. 231,813, March 6, 1972, abandoned.

[52] U.S. Cl. .................. 203/3; 196/132; 62/21; 62/37; 203/DIG. 18
[51] Int. Cl.² .................................. B01D 3/42
[58] Field of Search ............... 203/1, 3, DIG. 18; 196/132; 55/18, 210, 67; 73/23.1; 235/151.12; 208/DIG. 1; 62/21, 37

[56] References Cited
UNITED STATES PATENTS

| | | | |
|---|---|---|---|
| 2,367,862 | 1/1945 | Gormly | 196/132 |
| 2,893,927 | 7/1959 | Mertz | 196/132 |
| 2,990,437 | 6/1961 | Berger | 196/132 |
| 3,106,462 | 10/1963 | Cottle | 55/210 |
| 3,208,230 | 9/1965 | Fourroux | 62/21 |
| 3,301,778 | 1/1967 | Cabbage | 208/DIG. 1 |
| 3,365,386 | 1/1968 | Van Pool | 208/DIG. 1 |
| 3,411,308 | 11/1968 | Bellinger | 62/21 |
| 3,449,215 | 6/1969 | Johnson et al. | 196/132 |
| 3,555,837 | 1/1971 | McLintock | 196/132 |
| 3,616,267 | 10/1971 | McNeill | 203/3 |

*Primary Examiner*—Norman Yudkoff
*Assistant Examiner*—Frank Sever

[57] ABSTRACT

This invention resides in a fractionation system having a hydrocarbon feed stream and an absorption medium stream from a suitable source thereof controllably passed into an absorber, an overhead product stream and a bottoms product stream discharging from the absorber, a fractionation vessel having upper, middle, and lower portions, said middle portion receiving the bottoms product from the absorber, another absorption medium stream controllably passed into the upper portion of the vessel, a two-component analyzing-ratioing-transmitting-controlling means associated with the bottoms product stream discharging from the fractionation vessel, and means associated with the absorption medium source stream for separating said source stream into the two absorption medium streams and controllably passing said two streams into the respective absorber and the upper portion of the fractionation vessel at rates responsive to a modified signal delivered by the two-component analyzing-ratioing-transmitting-controlling means.

15 Claims, 2 Drawing Figures

CONTROLLED FRACTIONATION METHOD AND APPARATUS

This application is a continuation of application Ser. No. 231,813, filed Mar. 6, 1972, now abandoned.

In the operation of fractionation systems, it is desirable to maintain a high separation efficiency and continuously produce product streams that are of substantially uniform characteristics. This invention therefore resides in a fractionation method and apparatus for controllably passing first and second absorption medium-containing streams into portions of a fractionation vessel having a hydrocarbon feed stream passing thereinto with the flow rates of said first and second absorption medium streams being controlled in response to a modified control signal delivered by a two-component analyzing-ratioing-transmitting-controlling means with said signal being responsive to the analysis ratio between two components of the bottoms product stream discharging from a lower portion of the fractionation vessel.

Other aspects, objects, and advantages of the present invention will become apparent from a study of the disclosure, the appended claims, and the drawing.

Figure 2:
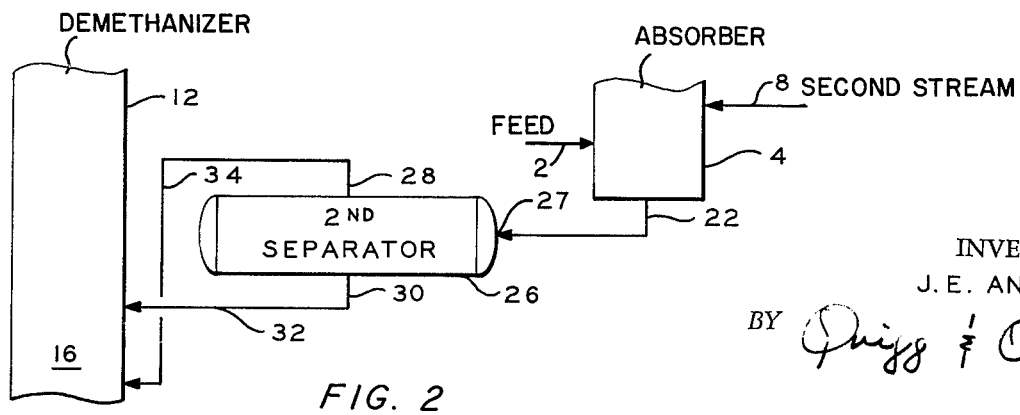

The drawing is a diagrammatic view of a controlled fractionation system having the control improvements of this invention. FIG. 1 shows an example fractionation system having the controls of this invention and FIG. 2 shows another embodiment of a portion of the system of FIG. 1.

It should be understood, however, that the system can be of other equipment and/or for other processes than as set forth in the drawing and as described herein, and that a reboiled, rich oil demethanizer in a natural gas liquids recovery plant and the analysis of methane ($CH_4$) and ethane ($C_2H_6$) as first and second components $C_1$ and $C_2$ of the bottoms product stream are referred to only for example purposes. It should also be understood that where the controlled fractionation system is for the demethanization of a feed stream comprising normally gaseous hydrocarbons dissolved in an absorption oil ($C_7$ and heavier), the system described and shown in the drawing is an excellent improvement over heretofore utilized methods and apparatus.

Referring to FIG. 1, a hydrocarbon feed stream 2 such as a natural gas passes into an absorber 4 via a first inlet conduit 6 of the absorber. A second absorption medium stream 8 (its source and composition hereafter more fully described) passes into the absorber 4 through a second inlet conduit 10 thereof. In the absorber 4, a portion of the feed stream 2 is absorbed by the second absorption medium stream 8 and passes therewith from the absorber 4 into a fractionation vessel 12. The fractionation vessel 12 has upper, middle, and lower portions 14, 16, 18. A first absorption medium stream 20 enters the upper portion 14 of fractionator 12, the second absorption medium stream 8 containing absorbed portions of said hydrocarbon feed stream 2 enters the middle portion 16 of the vessel 12 as a single stream via bottoms product conduit 22 which is connected at one end to a lower portion 24 of the absorber 4 and at the other end to the middle portion 16 of the fractionator 12. As shown in FIG. 2, the second absorption medium stream containing absorbed portions of the feed stream herein designated as stream 22 can be passed into the fractionator 12 as a plurality of streams if desired. In this embodiment, the second absorption medium stream 8 now containing absorbed feed components passes from the absorber 4 as stream 22 into a second separator 26 via an inlet conduit 27. The second separator 26 has a gas outlet conduit 28 and a liquid outlet conduit 30 operably connected to the middle portion 16 of the fractionator 12 for separating the stream 22 into a liquid stream 32 containing some absorbed gaseous components and a multicomponent gaseous stream 34 which has been flashed from the stream 22 in the second separator 26.

As further shown in FIG. 1, a bottoms product stream 36 discharges from the lower portion 18 of the vessel 12 via conduit 38. A main absorption medium stream 40, for example a lean absorption medium stream, enters the system as described below and is separated at location X to form the first and second absorption medium streams 20, 8. A side heater system 42 and a reboiling system 44, as known in the art, can be associated with the vessel 12. An overhead gas stream 46 is removed from the upper portion 14 of the vessel 12 for use such as fuel. All of the streams recited herein pass along their respective pathways through conduits which can be insulated or bare as desired. The various streams can also be passed through other heat exchange apparatus in order to improve the process efficiency as is known in the art.

A two-component analyzing-ratioing-transmitting means 48 such as a chromatographic analyzer-transmitter operably connected to a ratio computer as known in the art, is associated with the fractionator bottoms product stream 36 for measuring the concentrations of first and second components in the bottoms product stream 36 and delivering a signal A responsive to the measured composition ratio of the components. For example, in a demethanizing fractionator 12, the analyzer can measure the concentrations of $CH_4$ as component $C_1$ and $C_2H_6$ as component $C_2$ of the bottoms product stream 36 and deliver a signal A responsive to the ratio of $C_2/C_1$ or $C_1/C_2$, preferably the former.

An analysis ratio controller 50 having a set point B is connected to the analyzing-ratioing-transmitting means 48 for receiving the signal A, comparing said signal A to the set point B (desired ratio) and delivering a signal C in response to said comparison. The chromatographic analyzer, ratio computer and controller employed as the two-component analyzing-ratioing-transmitting means may be substantially as described in U.S. Pat. No. 3,208,230.

The output of the analyzer controller 50 can be connected to a high-limit relay 52 which has a set point signal D which is representative of the maximum permissible absorption oil flow rate. The high-limit relay 52 receives the signal C, compares said signal C to said set point signal D and delivers a signal E which is the lower of said signals C and D.

A ratio relay 54 has a set point F and is connected to the high-limit relay 52 for receiving the signal C or the signal E, multiplying said signal C or said signal E by the set point F and delivering a signal G in response to said multiplication.

First and second flow measuring elements 56, 58 are associated with respective first and second absorption medium streams 20, 8 for measuring the respective flow rates. First and second control valves 60, 62 are positioned in respective first and second streams 20, 8 at locations downstream of their respective flow measuring elements 56, 58 for controlling the respective stream flow rates. A first flow controller 64 is connected to the first flow measuring means 56, the first control valve 60, and the ratio relay 54 for receiving the signal G, comparing said signal G to a signal responsive to the measurement (56) of the flow rate of the first stream 20 and controlling the operation of the valve 60 and thereby the flow rate of the first stream 20 in response to said comparison. A second flow controller 66 is connected to the second flow measuring element 58, the second control valve 62, and to the output of element 52 for receiving signal C or signal E, comparing said signal C or said signal E to a signal responsive to the measurement (58) of the flow rate of the second stream 8, and controlling the operation of the valve 62 and thereby the flow rate of the second stream 8 in response to said comparison.

By splitting the stream 40 (derived by the operation of, for example, a dehexanizer 82 receiving the fractionator bottoms product so as to strip the absorbed natural gas liquids product components from the absorption oil) as it enters the system into first and second streams 20, 8 and exercising a flow ratio control over one of the streams and providing the associated control equipment, the first and second streams 20, 8 can be controlled to enter the vessel 12 at rates such that the ratio of one of the oil streams relative to the other is maintained at a constant preselected value even while the total flow varies. Deviations from the desired value B, of the analysis ratio, initiate change in the first and second stream flow rates, but these rates are maintained at the preselected ratio F relative one to the other. Where the fractionation system is a demethanizing system of a gasoline plant for example, the ratio of the first oil stream to the second oil stream can be maintained at a constant preselected value such as 0.6 so as to maintain a desired bottoms product stream 36 composition. As known in the art for such an absorption-stripping system, when lean oil flow rates are increased, the ethane and propane retention in the absorption medium is increased and the $C_2/C_1$ ratio in the bottoms product stream 36 will decrease.

The separation efficiency of a natural gas liquids recovery system can be further increased by passing second oil stream 8 in contact with all or part of the residue gas through a chiller 68 for lowering the temperature of said stream and thereafter passing the cooled stream by conduit 70 to a first separator 72 for phase separation of the presaturated, chilled oil from the residue gas. The first separator 72 has a bottoms conduit 74 for passing the degasified second oil stream 8' to the absorber 4 via the second inlet conduit 10. Residue gas separated by separator 72 is discharged via conduit 76.

The degasified second stream 8' is contacted with the natural gas feed stream in the absorber 4. An overhead product conduit 78 is located on the upper end 80 of the absorber 4 and connected to the second absorption medium stream 8 at a location upstream of the chiller 68, for precontacting the residue gas from absorber 4 with the lean absorption medium and passing the mixture through the chiller 68 and to the first separator 72. A bottoms product conduit 22 of the absorber 4 is connected to the vessel 12 directly in FIG. 1 or indirectly as described below in relation to FIG. 2 for passing the second absorption medium stream 8' into the vessel 12 at a location lower in elevation than the first oil stream 20. In a preferred embodiment, the second separator 26 is provided for further enhancing the separation efficiency of the fractionation system by feed flashing and separate feeding of the resulting gas and liquid to the fractionator 12.

In the operation of the system, the relative flow rates of the first and second absorption medium streams 20, 8 are maintained, in a preselected ratio with the absorption medium flow demand indicated and controlled by the analyzing-ratioing-transmitting means 48 and the associated control equipment. By splitting the stripped main absorption medium stream 40 into first and second streams 20, 8 and processing and delivering the streams 20, 8 to the fractionator 12 at different relative locations and under conditions where they have been processed differently, the operation of the fractionator 12 can be improved and thereby more efficiently produce a bottoms product stream 36 of more exact specifications which in turn produces the desired specifications of the natural gas liquids product stream 84 fractionated by stripping the "rich oil" (absorption medium plus dissolved gaseous components) in the dehexanizer 82.

The relative placement of the entry locations of first and second streams 20, 8 into vessel 12 is dependent upon the process temperatures, vessel dimensions, type of feed, and other variables known in the art and can be determined by one skilled in this art after these variables have been established.

In an example system as shown in the drawing, the compositions of the various streams are as follows:

EXAMPLE

| Composition Mol % | Inlet Gas No. 2 | Residue Gas No. 76, 78 | Rich Oil to Demethanizer No. 22 | Demethanizer Overhead No. 46 | NGL Product No. 84 | Lean Oil No. 40 |
|---|---|---|---|---|---|---|
| $N_2$ | 2.4 | 3.0 | 0.1 | 0.8 | 0.0 | |
| $CH_4$ | 76.8 | 88.5 | 7.6 | 92.2 | 0.9 | |
| $C_2H_6$ | 11.6 | 8.1 | 6.6 | 6.8 | 34.1 | |
| $C_3H_8$ | 5.7 | 0.4 | 7.0 | 0.1 | 39.3 | |
| $iC_4H_{10}$ | 0.8 | | 0.9 | | 5.3 | |
| $nC_4H_{10}$ | 1.7 | | 2.3 | | 11.8 | 0.2 |
| $iC_5H_{12}$ | 0.3 | | 0.5 | | 2.6 | 0.1 |
| $nC_5H_{12}$ | 0.4 | | 0.6 | | 2.5 | 0.2 |
| $C_6$ or $C_6+$ | 0.3 | Trace | 5.0 | 0.1 | 2.7 | 6.0 |
| $C_7$ or $C_7+$ | | | 24.0 | | 0.8 | 32.1 |
| $C_8$ | | | 41.3 | | | 55.9 |
| $C_9+$ | | | 4.1 | | | 5.5 |
| | 100.0 | 100.0 | 100.0 | 100.0 | 100.0 | 100.0 |
| Approximate Gas Flow Rate MM SCF/Day | 41.3 | 33.0 | | 2.58 | | |
| Approximate Liquid Flow Rate M Gallons/Day | | | 303.2 | | 53.7 | 225.0 |

It should be understood that the fractionation method and apparatus of this invention can be used for other systems beside the control of a demethanizing vessel, and that this designation was utilized herein for convenience purposes only.

Other modifications and alterations of this invention will become apparent to those skilled in the art from the foregoing discussion, example, and accompanying drawing, and it should be understood that this invention is not to be unduly limited thereto.

I claim:

1. A controlled fractionation system comprising:

a fractionation means;

an absorber;

first means for passing an absorber feed stream into said absorber;

second means for passing a second absorption medium stream into said absorber;

third means for removing an absorber overhead stream from said absorber;

fourth means for removing an absorber bottoms product stream from said absorber and passing said absorber bottoms product stream into the intermediate portion of said fractionation means as feed to be fractionated;

fifth means for passing a first absorption medium stream into the upper portion of said fractionation means;

sixth means for removing a fractionator overhead product stream from the upper portion of said fractionation means;

seventh means for removing a fractionator bottoms product stream from the lower portion of said fractionation means;

analyzing-ratioing-transmitting means for measuring the concentration of first and second components in said fractionator bottoms product stream and delivering a signal A responsive to the ratio of one of said components to the other;

eighth means for dividing said fractionator bottoms product stream into an end product stream, said first absorption medium stream, and said second absorption medium stream;

ninth means for measuring the flow rate of said first absorption medium stream and delivering a first flow rate signal responsive thereto;

tenth means for measuring the flow rate of said second absorption medium stream and delivering a second flow rate signal responsive thereto;

eleventh means for producing a control signal, said eleventh means comprising an analysis controller having a set point B representative of the desired value of said ratio and being connected to the analyzing-ratioing-transmitting means for receiving signal A, comparing said signal A to the set point B, and delivering said control signal in response to said comparison;

twelfth means for receiving said control signal and one of said first and second flow rate signals and controlling the flow rate of the respective first or second absorption medium stream associated with said one of said first and second flow rate signals in response to a comparison of said control signal and said one of said first and second control signals;

a ratio relay having a set point F and being adapted for receiving said control signal, multiplying said control signal by a set point F and delivering a signal G in response to said multiplication; and thirteenth means for receiving said signal G and the remaining one of said first and second flow rate signals not received by said twelfth means and controlling the flow rate of the remaining first or second absorption medium stream not controlled by said twelfth means in response to a comparison of said signal G with said remaining one of said first and second flow rate signals.

2. A controlled fractionation system comprising:

a fractionation vessel;

an absorber;

first means for passing an absorber feed stream into said absorber;

second means for passing a second absorption medium stream into said absorber;

third means for removing an absorber overhead stream from said absorber;

fourth means for removing an absorber bottoms product stream from said absorber and passing said absorber bottoms product stream into the middle portion of said fractionation vessel as feed to be fractionated;

fifth means for passing a first absorption medium stream into the upper portion of said fractionation vessel;

sixth means for removing a fractionator overhead product stream from the upper portion of said fractionation vessel;

seventh means for removing a fractionator bottoms product stream from the lower portion of said fractionation vessel;

analyzing-ratioing-transmitting means for measuring the concentration of first and second components in said fractionator bottoms product stream and delivering a signal A representative of the ratio of one of said components to the other;

eighth means for dividing said fractionator bottoms product stream into an end product stream and a main absorption medium stream;

ninth means for dividing said main absorption medium stream into said first absorption medium stream and said second absorption medium stream;

tenth means for measuring the flow rate of said first absorption medium stream and delivering a first flow rate signal responsive thereto;

eleventh means for measuring the flow rate of said second absorption medium stream and delivering a second flow rate signal responsive thereto;

twelfth means for producing a modified control signal, said twelfth means comprising an analysis controller having a set point B representative of the desired value of said ratio and being connected to the analyzing-ratioing-transmitting means for receiving signal A, comparing said signal A to the set point B, and delivering a signal C in response to said comparison;

thirteenth means for receiving said modified control signal and said second flow rate signal and controlling the flow rate of said second absorption medium stream in response to a comparison of said modified control signal and said second flow rate signal;

a ratio relay having a set point F and being adapted for receiving said modified control signal, multiplying said modified control signal by a set point F and delivering a signal G in response to said multiplication; and fourteenth means for receiving said signal G and said first flow rate signal and controlling the flow rate of said first absorption medium stream in response to a comparison of said signal G and said first flow rate signal.

3. An apparatus, as set forth in claim 2, wherein said twelfth means further comprises a high limit relay having a set point D and being connected to said analysis controller for receiving said signal C, comparing said signal C to the set point D, and delivering a signal E representative of the lower of said signal C and said set point D.

4. An apparatus, as set forth in claim 3, further comprising cooling means associated with the second absorption medium stream at a location upstream of the absorber for lowering the temperature of the second absorption medium stream;
   a first separator connected to the second means and to the cooling means for receiving the cooled second absorption medium stream, removing gases therefrom, and delivering the remaining portion of the second absorption medium stream into the absorber; and
   fourteenth means for precontacting said absorber overhead stream with said second absorption medium stream and passing said absorber overhead stream into said cooling means.

5. Apparatus, as set forth in claim 3, wherein said fourth means comprises:
   a second separator connected to the lower portion of the absorber;
   a gas conduit connected to an upper portion of said second separator and to the middle portion of the fractionation vessel at a first location; and
   a liquid conduit connected to a lower portion of the second separator and to the middle portion of the fractionation vessel at a second location, said second location being higher in elevation than said first location.

6. An apparatus, as set forth in claim 3, wherein said absorber feed stream comprises normally gaseous hydrocarbons, wherein said fractionation vessel comprises a demathanizer, wherein said eighth means comprises a dehexanizer, wherein said main absorption medium stream produced by said eighth means and said first absorption medium stream and said second absorption medium stream produced by said ninth means comprise absorption oil, and wherein said first and second components measured by said analyzing-ratioing-transmitting means are $CH_4$ and $C_2H_6$.

7. A method for controllably fractionating a feed material comprising:
   passing a feed stream comprising said feed material into an absorber;
   passing a second absorption medium stream into said absorber;
   removing an overhead stream from said absorber;
   removing an absorber bottoms product stream from said absorber and passing said absorber bottoms product stream into a fractionation zone;
   passing a first absorption medium stream into said fractionation zone;
   removing a fractionator overhead stream from said fractionation zone;
   removing a fractionator bottoms product stream from said fractionation zone;
   measuring the concentration of first and second components in said fractionator bottoms product stream and generating a ratio signal A representative of the ratio of one of said components to the other;
   dividing said fractionator bottoms product stream into an end product stream, said first absorption medium stream, and said second absorption medium stream;
   measuring the flow rate of said first absorption medium stream and delivering a first flow rate signal representative thereof;
   measuring the flow rate of said second absorption medium stream and delivering a second flow rate signal representative thereof;
   generating a control signal by comparing ratio signal A to a preselected set point B representative of the desired value of said ratio and delivering said control signal in response to said comparison;
   controlling the flow rate of one of said first and second absorption medium streams in response to a comparison of said control signal and the respective first or second flow rate signal associated with said one of said first and second absorption medium streams;
   multiplying said control signal by a preselected set point F and delivering a signal G in response thereto; and
   controlling the flow rate of the remaining one of said first and second absorption medium streams in response to a comparison of said signal G and the responsive first or second flow rate signal associated with said remaining one of first or second absorption medium streams.

8. A method for controllably fractionating a feed material comprising:
   passing a feed stream comprising said feed material into an absorber;
   passing a second absorption medium stream into said absorber;
   removing an overhead stream from said absorber;
   removing an absorber bottoms product stream from said absorber and passing said absorber bottoms product stream into a fractionation vessel;
   passing a first absorption medium stream into said fractionation vessel;
   removing a fractionator overhead stream from said fractionation vessel;
   removing a fractionator bottoms product stream from said fractionation vessel;
   measuring the concentration of first and second components in said fractionator bottoms product stream and generating a ratio signal A representative of the ratio of one of said components to the other;
   dividing said fractionator bottoms product stream into an end product stream and a main absorption medium stream;
   dividing said main absorption medium stream into said first absorption medium stream and said second absorption medium stream;
   measuring the flow rate of said first absorption medium stream and delivering a first flow rate signal representative thereof;
   measuring the flow rate of said second absorption medium stream and delivering a second flow rate signal representative thereof;
   generating a modified control signal by comparing ratio signal A to a preselected set point B representative of the desired value of said ratio and delivering a signal C in response to said comparison;

controlling the flow rate of said second absorption medium stream in response to a comparison of said modified control signal and said second flow rate signal;

multiplying said modified control signal by a preselected set point F and delivering a signal G in response thereto; and controlling the flow rate of said first absorption medium stream in response to a comparison of said signal G and said first flow rate signal.

9. A method, as set forth in claim 8, wherein generating a modified control signal additionally comprises comparing said signal C to a preselected set point D and delivering a signal E representative of the lower of said signal C and said set point D.

10. A method, as set forth in claim 9, including lowering the temperature of the second absorption medium stream in a cooling zone;

separating gases from the cooled second absorption medium stream; delivering the remaining portion of said second absorption medium stream into contact with the feed material; and contacting said overhead stream removed from said absorber with said second absorption medium stream and passing said overhead stream removed from said absorber into said cooling zone.

11. A method, as set forth in claim 8, including separating the absorber bottoms product stream into a gaseous stream and a liquid stream;

passing the gaseous stream into the fractionating vessel at a first location; and passing the liquid stream into the fractionating vessel at a second location, said second location being higher in elevation than said first location.

12. A method, as set forth in claim 8, wherein the first and second absorption medium streams are of a common composition.

13. A method, as set forth in claim 8, wherein the ratio of the first and second absorption medium streams is maintained substantially constant and the total flow rate of said streams is varying.

14. A method, as set forth in claim 8, wherein said feed material comprises normally gaseous hydrocarbons;

wherein said fractionation vessel is a demethanizer; wherein dividing said fractionator bottoms product stream into said end product stream and said main absorption stream comprises passing said fractionator bottoms product stream through a dehexanizer; wherein said main absorption medium stream, said first absorption medium stream, and said second absorption medium stream comprise absorption oil; and wherein measuring the concentration of first and second components in said fractionator bottoms product stream comprises measuring the concentration of $CH_4$ and $C_2H_6$ in said fractionator bottoms product stream.

15. A method, as set forth in claim 14, wherein the ratio of the first and second absorption medium streams is maintained substantially constant and the total flow rate of said streams is varying.

* * * * *

UNITED STATES PATENT AND TRADEMARK OFFICE
CERTIFICATE OF CORRECTION

PATENT NO. : 3,926,742
DATED : December 16, 1975
INVENTOR(S) : John E. Anderson

It is certified that error appears in the above-identified patent and that said Letters Patent are hereby corrected as shown below:

Column 6, line 1, claim 1, after "signal" the comma should be deleted; column 8, line 30, claim 7, change "responsive" to --- respective ---.

Signed and Sealed this

Twelfth Day of April 1977

[SEAL]

Attest:

RUTH C. MASON
*Attesting Officer*

C. MARSHALL DANN
*Commissioner of Patents and Trademarks*